Patented Aug. 24, 1954

2,687,417

UNITED STATES PATENT OFFICE 2,687,417

PRODUCTION OF 3-CHLOROCOUMARIN

John T. Rucker, Lewiston, N. Y., assignor to Hooker Electrochemical Company, Niagara Falls, N. Y., a corporation of New York No Drawing. Application November 29, 1950,
Serial No. 198,240

5 Claims. (Cl. 260—343.2)

This invention relates to a process for the production of 3-chlorocoumarin. More particularly it relates to improvements in the process for making 3-chlorocoumarin by chlorination of coumarin to make coumarin dichloride, followed by the dehydrochlorination of the dichloride to yield the desired 3-chlorocoumarin.

It is known that 3-chlorocoumarin may be prepared by passing gaseous chlorine into a solution of coumarin dissolved in carbon tetrachloride to obtain coumarin dichloride, and that the dichloride so prepared may be converted to 3-chlorocoumarin by treatment with alkaline dehydrochlorinating agents such as alcoholic potash or aqueous bicarbonate.

Still another known process involves chlorinating coumarin dissolved in tetrachloro- or pentachloro-ethane, to produce coumarin dicholride, followed by distilling said solvent from the dichloride at the boiling point of the solvent, said boiling temperature being sufficient to effect an incomplete dehydrochlorination of the dichloride to 3-chlorocoumarin, but not sufficiently elevated to cause decomposition into tars and other undesirable products. In this latter process, in order to get a high yield of 3-chlorocoumarin, it is necessary to complete the dehydrochlorination in an additional step to the process which is time consuming and involves additional equipment and materials; also it is necessary to use between five and ten times as much solvent as coumarin, in order to effect the chlorination in accordance with said process. This is undesirable since tetrachloro- and pentachloro-ethanes are expensive solvents, and in addition, the excessive amount of solvent required, necessitates a high heat requirement for its removal, and also necessitates the use of voluminous equipment resulting in a correspondingly low yield of product per unit of equipment utilized. Still further, it is necessary to use an excess of chlorine during the chlorination step of this process, because some of it is used up in chlorinating the solvent to an undesirable side reaction product, hexachloroethane, thereby resulting in a corresponding loss of solvent; also, as the reaction progresses toward completion, less efficient use is made of the chlorine. Moreover, the process is difficult to operate and the overall effect of its many disadvantages is to make a process which is not satisfactory from the commercial point of view.

Still another known process for preparing 3-chlorocoumarin comprises first passing chlorine into a chloroform solution of coumarin to obtain coumarin dichloride and thence converting the dichloride so formed by treatment with alcoholic potash to 3-chlorocoumarin. This process has been reported as not being capable of producing yields over 40 per cent of theoretical and it has been found not suitable for adaptation to commercial scale manufacture of 3-chlorocoumarin. It has also been reported that if the dehydrochlorination is effected in the absence of a solvent, tars and other decomposition products lower the yield and quality of the 3-chlorocoumarin produced in this way.

Since coumarin is a solid, it is necessary to dissolve it in a solvent in order to effect its chlorination with gaseous chlorine. A desirable solvent for this reaction is carbon tetrachloride since it is inexpensive, readily available, and not affected by gaseous chlorine during the reaction; in addition, it may be distilled from the intermediate product at a temperature of about 80° C. thereby decreasing the heat requirement as compared to that needed to distill an equivalent amount of the tetrachloro- or pentachloro-ethane solvents, which boil above 146 and 162° C., respectively. Carbon tetrachloride is also a particularly suitable solvent for effecting the chlorination of courmarin to coumarin dichloride since the reaction mixture may be conveniently refluxed at the optimum chlorination temperature, which is between 63 and 83° C., for obtaining the maximum yield of coumarin dichloride. However, in the prior art process using carbon tetrachloride as the solvent, it is necessary to use about nine parts of solvent to one part of coumarin, in addition to a three fold excess of chlorine over that theoretically required to make 3-chlorocoumarin, in order to realize about a 75 per cent yield of 3-chlorocoumarin, when the dehydrochlorination is effected in the presence of aqueous alkaline agents such as bicarbonate. This process has therefore been uneconomical and impractical for commercial manufacture of 3-chlorocoumarin. Heretofore, the teaching in the art for the chlorination of coumarin to make coumarin dichloride, for the purpose of making 3-chlorocoumarin has been that catalysts such as light do not affect the reaction to give improved yields of the desired end-product.

I have now found, contrary to the teaching of the prior art, that 3-chlorocoumarin may be produced economically in high yields, above 90 per cent of theory, by the process which comprises effecting the chlorination of coumarin, dissolved in a solvent, with gaseous chlorine in the presence of actinic light as a catalyst, distilling the solvent therefrom, and then heating the distillate residue of coumarin dichloride to a temperature of at least 190° C. to effect the thermal dehydrochlorination of the coumarin dichloride to yield crude 3-chlorocoumarin. The crude 3-chlorocoumarin may be purified by recrystallization from a suitable solvent to give a high purity product melting at 122 to 123° C. in more than 90 per cent yield. I have also found that by effecting the chlorination in the presence of actinic light as a catalyst, the amount of solvent necessary may be decreased to about two parts of solvent per part of coumarin, and also that substantially the theoretical quantity of chlorine, to form coumarin dichloride, is all that is necessary in order to realize a high yield of desired end-product.

In accordance with my invention, therefore, one part of coumarin, dissolved in about two parts of carbon tetrachloride, is treated with substantially the theoretical quantity of gaseous chlorine necessary to form coumarin dichloride, at substantially the reflux-temperature of the mixture, which is 70 to 80° C., in the presence of actinic light as a catalyst for the chlorination. After the chlorination is complete the carbon tetrachloride is distilled at a temperature of from about 80° C., and the distillate residue, which is coumarin dichloride, is heated to a temperature above about 190 C. until the evolution of hydrogen chloride is substantially complete, thereby resulting in the production of crude 3-chlorocoumarin. The residue remaining in the still may then be recrystallized from isopropyl alcohol to give a substantially pure 3-chlorocourmarin melting at 122 to 123° C. in between 90 and 95 per cent yield.

In the practice of my invention, I have found it advisable to effect the chlorination in the presence of actinic light such as that emitted from an ultraviolet lamp giving off light including the wave lengths of 2800 to 5400 angstrom units. I have not found it necessary to effect the purification of the solvent to be used during the chlorination, however, it is desirable that it be sufficiently clear to transmit the actinic light efficiently. In addition, the solvent should be inert with respect to chlorine at elevated temperatures. Of the various solvents possible, carbon tetrachloride has been found to be most suitable and it is highly preferred over and above any of the other inexpensive solvents now commercially available. It is preferably to carry out the chlorination in the absence of metallic iron, however, if the chlorination is carried out in contact with other metals such as lead or nickel, no adverse effects are apparent. In accordance with my process, I have found it advantageous to effect the dehydrochlorination of coumarin dichloride at high temperatures, at least above 190° C. This finding is contrary to the teaching in the prior art which cautions that high dehydrochlorination temperatures cause decomposition. I have found that dehydrochlorination temperatures maintained up to about 250° C. produce satisfactory results with a minimum of time. This is a distinct advantage over the process using tetrachloro- or pentachloro-ethanes as the solvent, described above, in that in said process the time for dehydrochlorination is conditioned by the boiling point and rate at which the solvent may be distilled in said process, it being necessary to provide a suitable time period during distillation to effect the thermal decomposition of the coumarin dichloride to 3-chlorocoumarin. Any suitable solvent may be used to effect the recrystallization of crude 3-chlorocoumarin to produce a high melting product. Isopropyl alcohol has been found satisfactory for this purpose and it is preferred for this use.

The following examples are given so that this invention may be more readily understood, however, they are not to be construed as limiting except as defined in the appended claims.

*Example I*

Two hundred and nineteen grams (1.5 moles) of coumarin and 450 grams of carbon tetrachloride are charged into a one liter glass flask provided with temperature recording means, heating means, a chlorine inlet tube, an agitator, a reflux condenser and a mercury vapor lamp emitting light including wave lengths 2800 to 5400 angstrom units. The contents of the flask is agitated and heated, whereupon the coumarin becomes dissolved. The heating is continued, to a temperature of about 75° C., until gentle refluxing occurs, and maintained thereat during the course of the chlorination. About 106 grams (1.5 moles) of gaseous chlorine is introduced into the agitated, irradiated reaction mixture over the course of about one hour, at the end of which time the carbon tetrachloride is distilled from the reaction zone as rapidly as practicable. The oily distillate residue remaining in the flask is heated to a temperature of about 200° C. for a period of about one and one-half hours after which time the evolution of hydrogen chloride ceases. The crude product remaining in the flask, has a melting point of about 118° C. and is light tan in color. It is purified by recrystallizing from about 800 cc. of isopropanol; a 95.2 per cent yield of substantially pure 3-chlorocoumarin, based on the coumarin originally charged, having a melting point of 122° C., is recovered.

*Example II*

The foregoing example is repeated, except that the chlorination is effected, first in the presence of metallic nickel and nickel chloride, and then in the presence of metallic lead and lead chloride, to determine the effect, if any, of these materials on the chlorination. A 96 per cent yield of 3-chlorocoumarin having a melting point of 122° C. is recovered in both instances.

*Example III*

In a manner after Example I, 1500 pounds of coumarin dissolved in 250 gallons of carbon tetrachloride is chlorinated in an enamel lined vessel, in contact with metalic nickel and lead, in the presence of light, over the course of 13 hours, by introducing about 680 pounds of chlorine into the reaction mixture, which is maintained at about 75° C., the reflux temperature. After all the chlorine is introduced, the carbon tetrachloride is distilled from the reaction mixture. The oily distillate residue remaining is heated to a temperature of about 205° C. for about four hours. The crude product resulting from this treatment has a melting point of about 119° C. and is light tan in color. It is purified by recrystallizing from isopropanol; 1700 pounds, representing 92 per cent of theory, of substantially pure 3-chlorocoumarin, melting at about 122° C., is recovered.

*Example IV*

In a manner after Example III, 1500 pounds of coumarin dissolved in 250 gallons of carbon tetrachloride is chlorinated in 10 hours by introducing about 700 pounds of chlorine into the reaction mixture. The solvent is distilled off, then dehydrochlorination of the dichloride is effected in about one hour, by heating at a temperature of about 225° C. The resulting product is purified by recrystallizing from isopropanol; 1750 pounds, representing 94.4 per cent of theory, of substantially pure 3-chlorocoumarin, melting at 123° C., is recovered.

From the foregoing, it is apparent that the present invention for making 3-chlorocoumarin is a vast improvement over the processes of the prior art, in that the yield of desired product is increased from about 75 per cent to about 90 to 95 per cent of the theoretical, while using the most economical solvent for the reaction. In addition the chlorine necessary for the reaction is decreased from over two moles per mole of reactant to substantially one mole per mole of reactant. Moreover, by operating in accordance with this invention, which provides for a fivefold reduction in the amount of solvent required, the equipment capacity is increased at least fivefold and the recovery of solvent is facilitated by its five-fold decrease. With this, there is an accompanying saving in heat requirement, and in time. The dehydrochlorination step of this invention simply involves heating the dichloride to cause the evolution of hydrogen chloride. This reaction may be accelerated, without decomposition, and to substantial completion, by merely increasing the temperature of the oily residue remaining after distilling off the solvent, up to about 250° C. By conducting the reaction in this manner, the need for additional equipment and extra materials involved in the aqueous or alcoholic alkaline dehydrochlorination procedures, is eliminated.

I claim:

1. The process for production of 3-chlorocoumarin which comprises: introducing gaseous chlorine in substantially theoretical proportions required to produce dichlorination into a mixture of coumarin dissolved in carbon tetrachloride maintained at the reflux temperature of said mixture in the presence of actinic light; distilling the solvent from the reaction mixture; heating the distillate residue to a temperature between about 190 and 250° C., until the evolution of hydrogen chloride has been completed, to form crude 3-chlorocoumarin; and, recovering substantially pure 3-chlorocoumarin by recrystallizing the crude from isopropyl alcohol.

2. In a process for preparing 3-chlorocoumarin from coumarin, the steps including: dissolving one part by weight of coumarin in about two parts by weight of carbon tetrachloride, irradiating said mixture with actinic light and introducing gaseous chlorine into the irradiated mixture in substantially theoretical proportions required to produce dichlorination, separating the solvent from the coumarin dichloride so produced, and then effecting the thermal dehydrochlorination of the coumarin dichloride to yield 3-chlorocoumarin.

3. The process for the production of 3-chlorocoumarin which comprises: mixing coumarin in carbon tetrachloride, heating said mixture to effect solution, irradiating the solution with actinic light and introducing gaseous chlorine in substantially theoretical proportions required to produce dichlorination into the irradiated solution, maintaining the temperature of chlorination at substantially the reflux temperature of the reaction mixture, then effecting the thermal dehydrochlorination of the coumarin dichloride so produced after separating the solvent therefrom, and recovering substantially pure 3-chlorocoumarin in high yield by recrystallizing the dehydrochlorinated product from a solvent therefor.

4. The process for the production of 3-chlorocoumarin which comprises: mixing one part by weight of coumarin in about two parts by weight of carbon tetrachloride, heating said mixture to a temperature of about 70 to 80° C., irradiating said mixture with actinic light and introducing gaseous chlorine into the irradiated reaction mixture in substantially the theoretical proportion required to produce dichlorination, maintaining the temperature of chlorination at substantially the reflux temperature of the reaction mixture, distilling off the solvent from the coumarin dichloride so produced, then subjecting the oily distillate residue to dehydrochlorination by means of heating to a temperature between about 190 and 250° C. to produce 3-chlorocoumarin.

5. The process for the production of 3-chlorocoumarin which includes the steps of refluxing one part by weight of coumarin and about two parts by weight of carbon tetrachloride, irradiating the solution so produced with actinic light and introducing gaseous chlorine into the irradiated reaction mixture in substantially the theoretical amount necessary to form coumarin dichloride, maintaining refluxing during the chlorination, then effecting the thermal dehydrochlorination of the coumarin dichloride to crude 3-chlorocoumarin after distilling the carbon tetrachloride from the dichloride, by means of heating to a temperature up to 250° C., and recovering substantially pure 3-chlorocoumarin in high yields by recrystallization of the crude 3-chlorocoumarin so produced from isopropyl alcohol.

References Cited in the file of this patent

UNITED STATES PATENTS

| Number | Name | Date |
| --- | --- | --- |
| 2,478,824 | Halbedel | Aug. 9, 1949 |